United States Patent [19]

Hobson et al.

[11] 4,119,757
[45] Oct. 10, 1978

[54] FLORAL DISPLAY BLOCKS OF UREA-FORMALDEHYDE FOAM

[75] Inventors: John A. Hobson, Minneapolis; Paul K. Schilling, St. Paul, both of Minn.

[73] Assignee: H & S Industries, Inc., St. Paul, Minn.

[21] Appl. No.: 863,602

[22] Filed: Dec. 23, 1977

[51] Int. Cl.² .......................... B32B 3/26; B32B 5/18
[52] U.S. Cl. .................................. 428/311; 427/244; 427/430 R; 521/53; 521/109; 521/121; 521/188; 521/905
[58] Field of Search ..................... 428/311; 260/2.5 F; 427/244, 430 R

[56] References Cited

U.S. PATENT DOCUMENTS

| | | | |
|---|---|---|---|
| 2,753,277 | 7/1956 | Smithers | 260/2.5 F |
| 2,900,278 | 8/1959 | Powers et al. | 427/244 |
| 3,197,327 | 7/1965 | Dillon | 427/244 |
| 3,826,674 | 7/1974 | Schwarz | 428/311 |

*Primary Examiner*—Morton Foelak
*Attorney, Agent, or Firm*—Orrin M. Haugen

[57] ABSTRACT

Hydrophilic floral display foam blocks are prepared from frothed urea-formaldehyde, and wherein the urea-formaldehyde contains an alkyl-aryl sulfonate, and wherein the alkyl-aryl sulfonate has been exposed to an aqueous solution of a quaternary ammonium salt in an amount sufficient to provide at least equal molar concentrations of the quaternary ammonium salt to the alkyl-aryl sulfonate present in the foam. The urea-formaldehyde foam may also contain quantities of sodium molybdate to enhance the stability and lifetime of cut flowers retained in the foam material. Also, the urea-formaldehyde foam may contain starch to help suppress the free formaldehyde odor and help increase the biodegradability of the cured foam. The resulting foam is hydrophilic in nature, and hence is readily wetted, with the hydrophilic characteristic not adversely affecting the life of cut flowers retained therein.

9 Claims, No Drawings

FLORAL DISPLAY BLOCKS OF UREA-FORMALDEHYDE FOAM

BACKGROUND OF THE INVENTION

The present invention relates generally to an improved floral display foam block, and more specifically to a floral foam display block prepared from frothed urea-formaldehyde resin. The urea-formaldehyde resin is treated so as to render the resultant foam hydrophilic in nature, and further providing for extended lifetime of cut flowers retained therein.

Urea-formaldehyde foam is a desired material for retention of floral displays, and has been widely utilized for such purposes in the past. Normally, however, urea-formaldehyde foam is hydrophobic upon curing, and may contain more than about 60% of closed cells in the foamed structure. The foam may be rendered substantially open cell by mechanically or physically crushing.

In the past, attempts have been made to render urea-formaldehyde foams hydrophilic through the soaking of a cured foam in an aqueous solution of a surfactant. However, it has been found that most surfactants, particularly those of the alkyl-aryl sulfonate type do not render the resultant cured foam product hydrophilic, inasmuch as the hydrophilic ends of the surfactant appear linked, bonded, or otherwise attached to the inside surfaces of the cured resin material. Furthermore, the use of alkyl-aryl sulfonates renders the moisture content of the foam generally anionic in nature.

It has been found that when the water content of a saturated floral display foam block is reasonably anionic, the water and the structure becomes toxic to cut flowers retained therewithin. While the reason for the toxicity is not precisely known, it appears to be due to the presence of toxic soluble salt levels, or toxic burning of the cut stems, thus generally prohibiting natural pathogens of the cut flowers to function efficiently or normally, and furthermore by not allowing the natural function of plant enzymes which regulate plant metabolism to function normally. Tests have verified that the quality of cut flowers deteriorates rather rapidly under these conditions. Evidence of the deterioration includes darkening of the stems, the drying of leaves, and the drooping of the flowers prematurely.

It has been found that the ionic balance of the foam may be adjusted by post-cure treatment of the foam with an equivalent cationic surfactant so as to control the ionic balance of the water. The alkyl-aryl sulfonate solutions are counter-balanced with an equivalent molar presence of quaternary ammonium salts, thus contributing to a double-decomposition of the alkyl-aryl sulfonates and quaternary ammonium salts through precipitation of an insoluble residual salt. As a result, the toxicity level of the foam is reduced, while the hydrophilic nature of the foam is preserved. The lifetime of cut flowers retained within the floral display foam increases, and exceeds that of the same cut flowers in water.

As a further feature of the invention, the pH of the foam is controlled to be at a desirable level, specifically in the range of approximately 3.5 to 4. Generally, urea-formaldehyde foams may have a pH of less than 2, which is normally the pH upon initial setting of the foam. Cured foam utilizing alkyl-aryl sulfonate stabilizers exhibit a pH of about 3.5 to 4.

SUMMARY OF THE INVENTION

Therefore, it is a primary object of the present invention to provide an improved hydrophilic floral display foam block of urea-formaldehyde foam wherein the foam block possesses qualities which preserve cut flowers for periods of time in excess of that available from water alone.

It is a further object of the present invention to provide an improved floral display foam block of urea-formaldehyde foam, and wherein the foam is rendered highly hydrophilic in nature, so as to expedite wetting of the foam without requiring forced emersion of the foam to achieve wetting.

It is yet a further object of the present invention to provide an improved hydrophilic floral display foam block of urea-formaldehyde, wherein the urea-formaldehyde foam contains a alkyl-aryl sulfonate surfactant together with a quaternary ammonium salt so as to achieve proper anionic balance of the foam for floral retention purposes.

It is yet a further object of the present invention to provide an improved floral display foam block of urea-formaldehyde foam which contains an alkyl-aryl sulfonate surfactant together with a quaternary ammonium salt to provide a desirable ionic balance, and further providing a substantially open cell configuration in the finished foam product.

Other and further objects of the present invention will become apparent to those skilled in the art upon a study of the following specification and appended claims.

DESCRIPTION OF THE PREFERRED EMBODIMENT

In order to comprehend the preparation of the preferred embodiment of the present invention, the following examples are given.

EXAMPLE I

A commercially available urea-formaldehyde resin liquid is utilized, the liquid being mixed with 3.5% to 7% of sodium tertiary-butyl-benzene sulfonate by weight of solids of resin to sulfonate. A blowing agent is added to the resin-alkyl-aryl sulfonate mixture at the rate of 75 to 150 psi, the blowing agent being a continuous flow of compressed air within a closed chamber as is conventional in the art. The alkyl-aryl sulfonate mixture contains phosphoric acid in an amount of approximately 10% to 20% by weight of solids of resin to acid to catalyze the resin and expedite the setting thereof.

The set foam is then cut into blocks of the desired size, for example, 4 inches by 9 inches, and subjected to a mechanical crushing wherein a 3 inch cross-sectional thickness of the block is halved, and allowed to substantially recover to 3 inches.

The alkyl-aryl sulfonate stabilizes the foam, but provides a finished product which is generally hydrophobic. The block is thereafter immersed in a solution of a quaternary ammonium salt, specifically "Arquad S-50" available from Armour Industrial Chemical Co. of Chicago, Ill. The molar concentration of the quaternary ammonium salt in the aqueous solution is sufficient so as to be in molar excess to the alkyl-aryl sulfonate.

If desired, sodium molybdate is added in a quantity of approximately 0.01%, based upon the weight of the resin, with the sodium molybdate releasing molybdenum in a useful form for plants, with the molybdenum assisting the plant in the fixation process of the root nodular microorganisms and in the nitrate reductose enzyme which controls reduction of inorganic nitrate into a form which the plant can utilize in building protein. Molybdenum has been designated as a key element in plant nitrogen metabolism, and also has other functions, such as being a requisite element for the synthesis of ascorbic acid and in the rendering of iron to be physiologically available within the plant. Molybdenum further alleviates plant injury caused by the presence of excessive amounts of other elements such as copper, boron, nickel, cobalt, manganese and zinc, all of which may be present in water solutions contacting cut flowers. The presence of the sulfate ion may decrease the amount of molybdenum which a plant may utilize, particularly from acid-based mediums.

EXAMPLE II

The urea-formaldehyde resin of Example I was treated with a blowing agent consisting of a continuous flow of compressed air, and wherein the blowing agent further contained approximately 3.5% by weight of the resin solids of an alkyl-aryl sulfonate, specifically sodium hexylbenzene sulfonate. To this formulation there was added 10% by weight of the resin solids of corn starch.

The material was heated to a temperature of 40° C. at which time frothing and setting were initiated, and the resin cured to a stable foam in a period of 8 hours.

Thereafter, the foam was cut into blocks of 4 inches by 9 inches in size, having a cross-sectional thickness of 3 inches and weighing approximately 35 grams. The cut blocks were then subjected to a compression operation in a press wherein the cross-sectional thickness was reduced to 1½ inches and thereafter the force was removed and the foam returned to approximately 3 inches. The block was then placed in a solution of a quaternary ammonium salt, specifically "Arquad S-50", wherein the quaternary ammonium salt was present in an amount of 3.9 grams per liter. The block was immersed and wetted to five times its weight of solution in the quaternary ammonium salt, after which it was permitted to dry at 21° C. In order to enhance the utilization of the floral display foam block, 0.04 grams per liter of sodium molybdate were added to the aqueous quaternary ammonium solution.

EXAMPLE III

The procedure of Example II was followed except that the alkyl-aryl sulfonate was sodium toluene sulfonate.

EXAMPLE IV

The procedure of Example III was followed with the exception that quaternary ammonium salt was utilized as the foaming agent, and alkyl-aryl sulfonate was utilized in the after-cure treating solution.

UREA-FORMALDEHYDE RESIN

Urea-formaldehyde resins are widely commercially available, and are normally prepared in a two-stage process in the presence of puiridine, ammonia or alcohol. Heat is provided and the pH is controlled to form certain intermediates such as methylolurea or dimethylolurea which are mixed with certain stabilizers to produce liquid water condensate resins. The resins are later converted to a thermal setting resin by controlling heating in the presence of a catalyst, such as, for example, in this instance, phosphoric acid.

ALKYL-ARYL SULFONATES

As has been indicated, alkyl-aryl sulfonates selected from the group consisting of sodium tertiary-butyl-benzene-sulfonate, sodium hexylbenzene sulfonate, and sodium toluene sulfonate may be utilized. Other sodium sulfonates may be employed, along with certain potassium analogues, such as the potassium analogues to the three sodium sulfonates specifically listed hereinabove. As has been indicated, the utilization of sodium sulfonate provides a foam which does not become properly hydrophilic until exposure to quaternary ammonium salts, or vice versa, whereby the quaternary ammonium salts are the foam stabilizers and the alkyl-aryl sulfonates are the after treating solutions.

QUATERNARY AMMONIUM SALTS

While any of a variety of quaternary ammonium salts may be employed in aqueous solution, the following are preferred: Alkyltrimethylammonium chloride which is water soluble; Dialkyldimethylammonium chloride which is water insoluble; "Arquad S-50" being the alkyltrimethylammonium chloride, the alkyl portion of the compound having a chain length of from 8 to 18 carbon atoms, and specifically, in the above examples, 16 carbon atoms. Specifically, the alkyl portion may be the hexadecyl, the octadecyl, the octadecadienyl, or the octadecenyl radicals. Such materials are commercially available.

As has been indicated, it is the function of the quaternary ammonium salt to modify the exposed portion of the alkyl-aryl sulfonate so as to render the entire product hydrophilic in nature.

THE USE OF STARCH

The use of starch has been found to be desirable from the standpoint of reducing or in some cases, eliminating the odor of formaldehyde from the finished product. It is believed that the presence of starch, specifically corn starch, provides a reactive site for formaldehyde which may be released in the product both during preparation, and subsequently during use and exposure to water. Also, the starch helps the biodegradability of the foam.

USE OF FILLERS

Normally, the finished product will have a density of approximately 1.2 pounds per cubic foot, however this density can be increased by the addition of either more resin or iron filings, sand, diatomaceous earth or the like. Normally, a density of approximately 1.2 pounds per cubic foot is desired.

BACTERIOSTAT

If desired, a hydroquinone bacteriostat such as is commercially available may be added in an aqueous solution containing approximately 0.05% by weight of hydroquinone bacteriostat. The utilization of bacteriostat do assist in controlling bacteria growth.

UREA-FORMALDEHYDE RESINS CONTAINING ALKYL-ARYL SULFONATES

Urea-formaldehyde resins containing foaming agents with alkyl-aryl sulfonates present are commercially available, with one such material being sold under the code designation "Rapco Foam" by Raperswill Corporation of New York, N.Y. Other detergent-type foaming agents may be utilized, a number of such materials being commercially available.

GENERAL COMMENTS

The improvement resulting from this change is a significant decrease in the time required for the partially cured foam to absorb a predetermined quantity of a soaking solution which contains both a nonionic and a cationic surfactant. It makes unnecessary a complex machine, the operation of which would require an employee with special training.

Since the active ingredient in the foaming agent is an anionic detergent, or surfactant, from the class of compounds with the general name alkyl-aryl sulfonate, and since it is known that the foam height such compounds can produce is increased on changing from tap water to distilled water, it appears quite likely that impurities in tap water inactivate a portion of the foaming agent. Certain cations present in tap water such as calcium, magnesium or iron can react with the active ingredient to form insoluble salts, much like the scum which results from using a soap in hard water. These insoluble salts can then be spread over the outer and inner surfaces of the foam structure, reducing the capacity of the foam to absorb the surfactants present in the soaking solution, or at least limiting the rate of this absorption.

In lieu of phosphoric acid set forth in the examples hereinabove, a water soluble acid may be used, including those water soluble acids selected from the group consisting of hydrochloric, benzene sulfonic and sulfuric acids.

Removal of these cationic impurities could improve the foam production process in two ways. First, by enhancing the efficiency of the foaming agent and secondly, by elimination of insoluble residues produced by their interaction with the foaming agent.

Also worthy of consideration is the fact that the soaking solution is now made with purified water whereas previously, it was made with tap water. The cationic surfactant contained in this solution may also react with anions such as fluoride, chloride, carbonate or sulfate, present in tap water, to produce insoluble residues which could interfere with absorption of the soaking solution by the foam in the same manner as has already been described.

In order to preserve the hydrophilic characteristics of the product, and in order to render the product more readily wettable, it may be desired to wet or soak the display blocks in water and package them in wet form. Such an arrangement would enable the consumer to more readily wet the product without delay. Normally, however, even dry floral display blocks prepared in accordance with the present invention may be utilized, since the hydrophilic qualities of the product render it quite readily wettable.

We claim:

1. The method of preparing hydrophilic floral display foam blocks of frothed urea-formaldehyde, wherein the urea-formaldehyde block comprises a solid frothed urea-formaldehyde resin with an alkyl-aryl sulfonate selected from the group consisting of sodium tertiary-butyl-benzene sulfonate, sodium hexylbenzene sulfonate, and sodium toluene sulfonate in an amount ranging from between 3.5% and 7% of the resin solids, phosphoric acid in an amount ranging from 10% to 20% of the resin solids; said method comprising:
   (a) immersing said urea-formaldehyde resin block in an aqueous solution of a quaternary ammonium salt selected from the group consisting of alkyltrimethylammonium chloride and dialkyldimethylammonium chloride wherein the alkyl portion of the compound has from between 8 and 18 carbon atoms, and wherein a molar concentration of quaternary ammonium salt is at least equal to the molar concentration of said alkyl-aryl sulfonate within the urea-formaldehyde resin.

2. The method of preparing hydrophilic floral display foam blocks of frothed urea-formaldehyde as defined in claim 1 being particularly characterized in that said alkyl-aryl sulfonate is 90% linear alkylate sulfonate-sodium salt.

3. The method as defined in claim 1 being particularly characterized in that said urea-formaldehyde resin contains starch.

4. The method as defined in claim 1 being particularly characterized in that sodium molybdate is present in said aqueous solution of quaternary ammonium salt.

5. Hydrophilic floral display foam blocks of frothed urea-formaldehyde resin, wherein said urea-formaldehyde resin block comprises:
   (a) a frothed urea-formaldehyde resin block of substantially open cell configuration, said urea-formaldehyde resin block including:
   (1) an alkyl-aryl sulfonate selected from the group consisting of sodiumtertiary-butyl-benzene sulfonate, sodium hexylbenzene sulfonate, and sodium toluene sulfonate in an amount ranging from between about 3.5% and 7% of the resin solids;
   (2) phosphoric acid in an amount ranging from between about 10% to 20% of the resin solids;
   (3) a quaternary ammonium salt selected from the group consisting of alkyltrimethylammonium chloride and dialkyldimethylammonium chloride wherein the alkyl portion of the compound has from between 8 and 18 carbon atoms, and wherein said ammonium salt is present in substantially equal molar relationship to said alkyl-aryl sulfonate.

6. The hydrophilic floral display foam blocks of frothed urea-formaldehyde resin as defined in claim 5 wherein said urea-formaldehyde foam member contains starch in an amount ranging from about 5% to 15%.

7. The hydrophilic floral display foam blocks of frothed urea-formaldehyde resin as defined in claim 1 wherein the urea-formaldehyde block comprises a solid frothed urea-formaldehyde resin with a quaternary ammonium salt selected from the group consisting of alkyltrimethylammonium chloride and dialkyldimethylammonium chloride in an amount ranging between 3.5% and 7% of the resin solids; phosphoric acid in an amount ranging from 10% to 20% of the resin solids; said method comprising:
   (a) immersing said urea-formaldehyde resin block in an aqueous solution of an alkyl-aryl sulfonate selected from the group consisting of sodium tertiary-butyl-bezene sulfonate, sodium hexylbenzene sulfonate, and sodium toluene sulfonate and wherein a molar concentration of alkyl-aryl sulfonate is at least equal to the molar concentration of said quaternary ammonium salt within the urea-formaldehyde resin.

8. The method as defined in claim 1 wherein the formal foam is shredded or changed in final shape or form to be utilized as a formal display material.

9. Hydrophilic floral display foam blocks of frothed urea-formaldehyde resin, wherein said urea-formaldehyde resin block comprises:
  (a) a frothed urea-formaldehyde resin block of substantially open cell configuration, said urea-formaldehyde resin block including:
    (1) an alkyl-aryl sulfonate selected from the group consisting of sodium tertiary-butyl-benzene sulfonate, sodium hexylbenzene sulfonate, and sodium toluene sulfonate in an amount ranging from between about 3.5% and 7% of the resin solids;
    (2) a water soluble acid selected from the group consisting of hydrochloric, benzene sulfonic and sulfuric acids;
    (3) a quaternary ammonium salt selected from the group consisting of alkyltrimethylammonium chloride and dialkyldimethylammonium chloride wherein the alkyl portion of the compound has from between 8 and 18 carbon atoms, and wherein said ammonium salt is present in substantially equal molar relationship to said alkyl-aryl sulfonate.

* * * * *